(12) United States Patent
Magrini

(10) Patent No.: US 9,268,353 B2
(45) Date of Patent: Feb. 23, 2016

(54) OPERATING MECHANISM FOR A BOWDEN CABLE

(75) Inventor: Sergio Magrini, Modena (IT)

(73) Assignee: CNH Industrial America LLC, New Holland, PA (US)

( * ) Notice: Subject to any disclaimer, the term of this patent is extended or adjusted under 35 U.S.C. 154(b) by 393 days.

(21) Appl. No.: 13/810,965

(22) PCT Filed: Jul. 8, 2011

(86) PCT No.: PCT/EP2011/061608
§ 371 (c)(1),
(2), (4) Date: May 14, 2013

(87) PCT Pub. No.: WO2012/010439
PCT Pub. Date: Jan. 26, 2012

(65) Prior Publication Data
US 2013/0228035 A1    Sep. 5, 2013

(30) Foreign Application Priority Data
Jul. 21, 2010    (IT) .............................. TO2010A0633

(51) Int. Cl.
| G05G 1/04 | (2006.01) |
| F16H 59/04 | (2006.01) |
| F16H 61/36 | (2006.01) |
| F16H 59/02 | (2006.01) |

(52) U.S. Cl.
CPC ................ *G05G 1/04* (2013.01); *F16H 59/042* (2013.01); *F16H 61/36* (2013.01); *F16H 2059/0295* (2013.01); *Y10T 74/20438* (2015.01)

(58) Field of Classification Search
CPC .............................. F16H 59/042; F16H 61/36

USPC .......................................... 74/473.15, 473.36
See application file for complete search history.

(56) References Cited

U.S. PATENT DOCUMENTS

| 4,630,500 | A | * | 12/1986 | Suzuki ........................ 74/473.15 |
| 4,873,884 | A | * | 10/1989 | Yamada et al. ............. 74/473.36 |
| 5,497,847 | A | * | 3/1996 | Ota et al. ..................... 180/333 |
| 6,006,623 | A | * | 12/1999 | Sugiyama ................... 74/473.15 |
| 2004/0226801 | A1 | * | 11/2004 | De Jonge et al. ... F16H 59/0204 192/220.7 |

FOREIGN PATENT DOCUMENTS

| DE | 3525833 | 4/1984 |
| DE | 196 25 854 A1 * | 1/1997 .............. F16H 59/04 |

(Continued)

OTHER PUBLICATIONS

Abstract of DE 196 25 854 A1, Chuouhatsujo, Jan. 1997.*

(Continued)

*Primary Examiner* — Vinh Luong
(74) *Attorney, Agent, or Firm* — Sue C. Watson

(57) ABSTRACT

An operating mechanism for a Bowden cable comprises a support bracket, an operating lever, a hub mounted on the support bracket for rotation about a first axis by the operating lever, a transmission lever connectable to the Bowden cable and mounted on the support bracket for pivoting about a second axis orthogonal to the first axis, and an actuating arm connected at one end to the hub and connected at its end remote from the hub by a sliding ball and socket joint to the transmission lever so that rotation of the hub about said first axis causes rotation of the transmission lever about the second axis to extend and retract the Bowden cable. In the invention, sliding axis of the ball and socket joint is inclined relative to both the first axis and the second axis.

15 Claims, 1 Drawing Sheet

(56) References Cited

FOREIGN PATENT DOCUMENTS

| EP | 0560645 | | 9/1993 | | |
| EP | 0 748 963 | A1 * | 12/1996 | .............. | F16H 61/36 |
| FR | 2676843 | * | 11/1992 | .............. | F16H 61/36 |

OTHER PUBLICATIONS

EPO Machine Translation of FR 2676843, Tate, Nov. 1992.*
PCT International Search Report and Written Opinion Dated Sep. 28, 2011.

* cited by examiner

OPERATING MECHANISM FOR A BOWDEN CABLE

CROSS REFERENCE TO RELATED APPLICATIONS

This application is the US National Stage filing of International Application Serial No. PCT/EP2011/061608, entitled "OPERATING MECHANISM FOR A BOWDEN CABLE," filed on Jul. 8, 2011, which claims priority to Italian Application Serial No. TO2010A000633, filed Jul. 21, 2010, each of which is incorporated herein by reference in its entirety for all purposes.

FIELD OF THE INVENTION

The present invention relates to an operating mechanism for a Bowden cable.

BACKGROUND OF THE INVENTION

There are several applications in which an operating mechanism is connected to a remotely located device by means of a Bowden cable. One example of such an application is a steering column mounted lever for selecting forward and reverse gear in a tractor. In this case, the opposite end of the Bowden cable would be a mechanical control lever on the gearbox or to a remotely located hydraulic selector valve. It is important in such an application that the lever movement should be positive, i.e. with minimal free play, so as to provide a firm feel to the operator.

EP 0 560 645 discloses a gear lever mechanism remotely connected to a gearbox by two Bowden cables, one for transmitting the left to right movements in the neutral position of the gear lever and the other for transmitting the front and rear movements that engage the different gear ratios. To transmit the left to right movement in the neutral position, an actuating arm is secured to the gear lever in such manner that it rotates with the gear lever during left to right movements but rotates about a transverse pin relative to the gear lever during front and rear movements. The free end of the actuating arm is coupled to one arm of a bellcrank lever of which the other arm is connected to one of the Bowden cables.

The coupling between the actuating arm and the bellcrank lever comprises a sliding ball and socket joint. Such a joint, in addition to allowing the relative inclination of the actuating arm and the bellcrank lever arm to change, allows the distance between them to vary. This is implemented in EP 0 564 645 by a pin that projects from the bellcrank lever and extends parallel to its axis of rotation. The pin carries at its end a ball that slidably engages in a cylindrical socket mounted on the actuating arm. In this construction, the sliding axis of the joint is the axis of the cylinder in which the ball is received.

Because the sliding axis in EP 0 564 645 extends parallel to the axis of the bellcrank lever, the coupling only works because, as earlier mentioned, the actuating arm is pivotable relative to the gear lever and can therefore move towards and away from the pivot point of the bellcrank lever as it rotates. In the absence of such an additional degree of motion of the actuating arm, the coupling between the actuating arm and the bellcrank lever would lock in one position.

The requirement for an additional pivot makes the cable operating mechanism more bulky and complex, and there is a need for more moving parts that are all prone to wear.

OBJECT OF THE INVENTION

The present invention seeks therefore to provide a simple, compact, ergonomic and reliable operating mechanism for a Bowden cable that does not require the actuating arm to be pivotable relative to the operating lever.

SUMMARY OF THE INVENTION

According to the present invention, there is provided an operating mechanism for a Bowden cable, comprising a support bracket, an operating lever, a hub mounted on the support bracket for rotation about a first axis by the operating lever, a transmission lever connectable to the Bowden cable and mounted on the support bracket for pivoting about a second axis orthogonal to the first axis, and an actuating arm connected at one end to the hub and connected at its end remote from the hub by a sliding ball and socket joint to the transmission lever so that rotation of the hub about said first axis causes rotation of the transmission lever about the second axis to extend and retract the Bowden cable, characterised in that the sliding axis of the ball and socket joint is inclined relative to both the first axis and the second axis.

Preferably, the sliding axis of the sliding ball and socket joint extends at about 45° to the two axes.

Advantageously, the sliding ball and socket joint comprises a ball retained in a spherical socket in one of the two arms and a pin extending in the direction of the sliding axis of the joint connected to the other of the two arms and slidably received in a bore in the ball.

By inclining the sliding axis of the ball and socket joint, the invention no longer requires the actuating arm to be pivotable relative to the hub and instead it may be rigidly connected to the hub or more preferable formed as an integral part of the hub.

The end of the actuating arm traces an arc in a first fixed flat plane whereas the point on the transmission lever to which it is connected traces an arc in a fixed orthogonal flat plane. A pin that extends normally to one of these two planes can only intersect the other plane in two fixed positions. It is for this reason that in EP 0 560 645 a second degree of motion is needed to prevent locking. By arranging the sliding axis of the ball and socket joint at an angle to the two fixed flat planes, and therefore intersecting both planes at all times, the invention ensures that the actuating arm and the lever arm can remain securely coupled to one another in all positions of the operating lever.

When using an operating mechanism to control forward and reverse movement, it is desirable to be able to lock the mechanism in the neutral position.

In a preferred embodiment of the invention, the operating lever is pivotable relative to the hub about an axis perpendicular to the first and second axes only when in a neutral position in order to engage in a locating recess defined by the support bracket.

Advantageously, the lever is spring biased to engage automatically in the neutral locating recess.

In the interest of compactness, the transmission lever is preferably a bellcrank lever.

BRIEF DESCRIPTION OF THE DRAWINGS

The invention will now be described further, by way of example, with reference to the accompanying drawings, in which.

DETAILED DESCRIPTION OF THE PREFERRED EMBODIMENT

Figure 1:
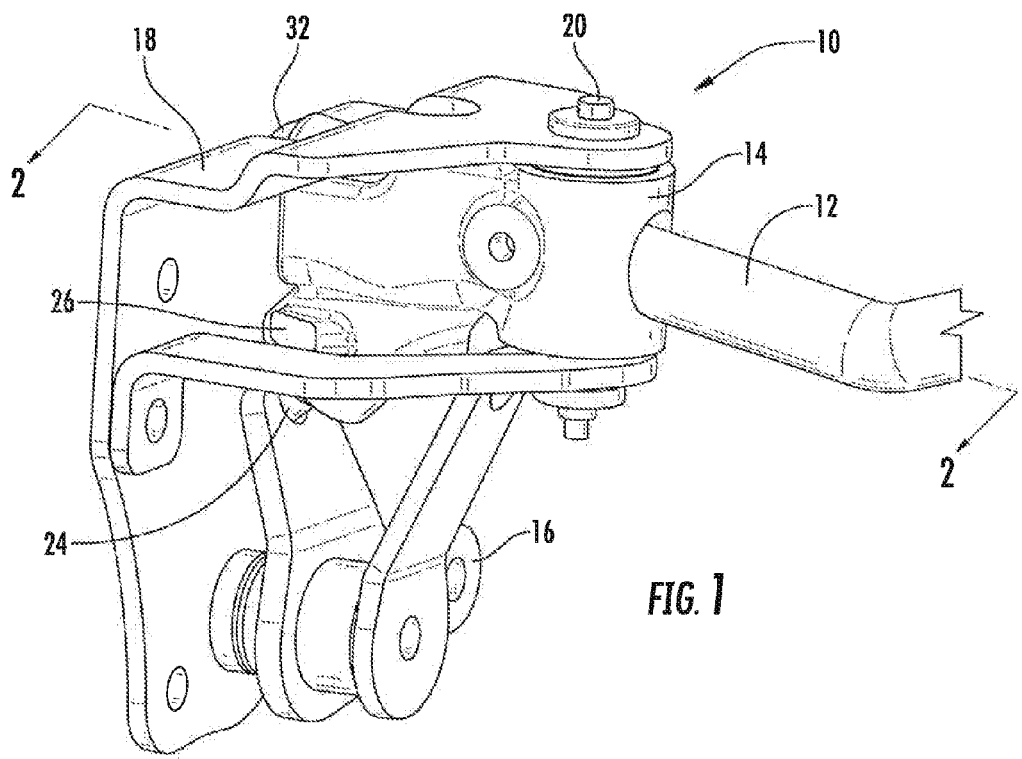
FIG. 1 is a perspective view of an operating mechanism of the invention.
Figure 2:
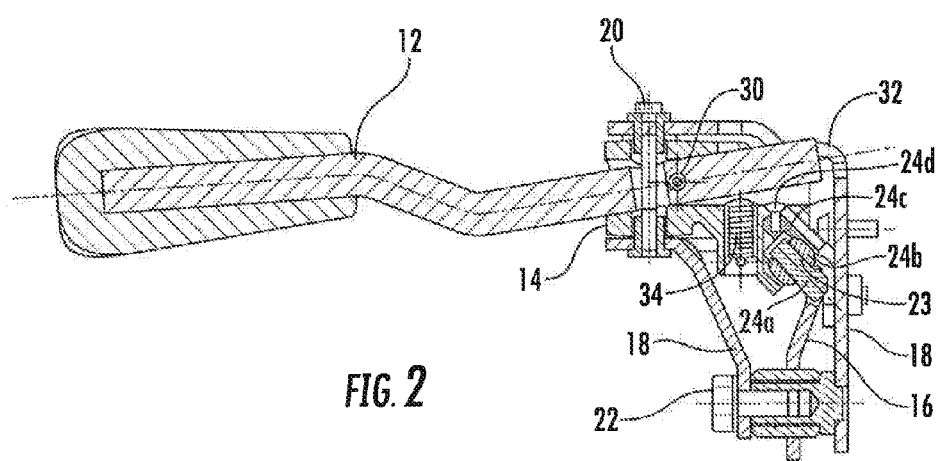
FIG. 2 is a section through the mechanism of FIG. 1 passing through a plane containing the axes of rotation of the hub and the transmission lever, as well as the sliding axis of the ball and socket joint.

The operating mechanism 10 shown in FIGS. 1 and 2 has three main moving components, namely an operating lever 12, a hub 14 and a transmission lever 16. These three components are mounted on a support bracket 18 which in the interest of clarity has been shown with transparent shading so as not to obstruct the view of the moving components.

The hub 14 can be pivoted by the operating lever 12 relative to the support bracket 18 about a first axis defined by a bolt 20. The transmission lever 16, which is a bellcrank lever, is pivotable relative to the support bracket 18 about a second axis defined by a bolt 22 (see FIG. 2). A coupling 24 connects one arm of the bell crank lever 16 to an actuating arm 26 that projects at an angle from the hub 14 so that as the hub 14 rotates about the first axis, the bell crank lever 16 rotates about the second axis. The other arm of the bellcrank lever 16 is connected to the Bowden cable that is to be extended and retracted.

In the preferred embodiment of the invention, the actuating arm 26 is formed as an integral part of the hub 14. Assuming in FIG. 1 that the first axis is vertical, then as the hub 14 pivots about this axis, the end of the actuating arm 26 will trace an arc in a horizontal flat plane. In the same way, as the bellcrank lever rotates about its second axis, the end of its arm traces an arc in a vertical plane. This geometry requires a special coupling that is capable of transmitting torque to the bell crank lever 16 in all positions of the hub 14, bearing in mind that the relative inclination of the two arms will change as well as their distance apart.

These requirements are met in the present invention by using a sliding ball and socket joint of which the sliding axis is inclined relative to the first axis and the second axis. As shown in FIG. 2, the arm of the bell crank lever 16 that is coupled to the actuating arm 26 is bent slightly out of the plane of the other arm and at its end there is mounted a pin 24a of which the axis is inclined relative to both the axis of rotation of the hub 14 and that of the bellcrank lever 16. The end of the pin 24a is slidably received within a bore 23 in a ball 24b retained within a spherical socket defined by a sleeve 24c retained within the end of the actuating arm 26 by a screw 24d. The sleeve 24c is flexible and formed with slots, or it may be made of slightly stretchable material. In this way, prior to its insertion into the end of the actuating arm, the end of the sleeve 24c can be deflected or expanded to allow insertion of the ball 24b into the socket. Once the sleeve 24c is inserted into the end of the actuating arm, the socket can no net longer expand and the ball is firmly retained. As an alternative, the socket may be defined between two hemispherical halves, of which the outer one is defined by a ring that is screw threaded into the end of the actuating arm.

As a further alternative, the pin 24a may be formed integrally with a ball at its end that is slidable in a cylindrical socket but the load bearing ability of this alternative construction is reduced because the ball only makes line contact with the cylindrical socket.

The change in relative inclination of the two arms is taken up by rotation of the ball within its socket. The change in distance between the ends of the arms, on the other hand, is taken up by the pin 24a sliding relative to the ball 24b. This is only possible if the sliding axis is inclined relative the pivotal axes of the actuating arm 26 and the bellcrank lever 16.

It is desirable to be able to lock the operating lever 12 in a central position. This is achieved in the illustrated embodiment of the invention in that the operating lever 12 is pivotable relative to the hub 14 about a pin 30, the axis of which is normal to the plane containing the first and second axes. The support bracket 18 has a recess 32 which is capable of receiving the end of the operating lever 12 only when the hub 14 is in a neutral position. The operating lever 12 is biased for engagement into the recess 32 by a spring 34, shown in FIG. 2.

In order to engage a forward or reverse movement of the operating lever 12, it is first necessary to pivot the operating lever 12 out of the recess 32 by moving it up as viewed in FIGS. 1 and 2, against the action of the spring 34. When retracted from one end position, the lever will be brought to a stop in the neutral position by being forced by the spring 34 into engagement with the recess 32. This avoids the lever movement being continued accidentally towards the opposite end position and it also ensures that, when left in the neutral position, the operating lever 12 does not move accidentally towards one of its end positions.

The invention claimed is:

1. An operating mechanism for a Bowden cable, comprising:
    a support bracket,
    an operating lever,
    a hub mounted on the support bracket for rotation about a first axis by the operating lever,
    a transmission lever configured to be connected to the Bowden cable and mounted on the support bracket for pivoting about a second axis orthogonal to the first axis, and
    an actuating arm connected at one end to the hub and connected at its end remote from the hub by a sliding ball and socket joint to the transmission lever so that rotation of the hub about the first axis causes rotation of the transmission lever about the second axis to extend and retract the Bowden cable, such that a sliding axis of the ball and socket joint is inclined relative to both the first axis and the second axis,
    wherein the operating lever is configured to pivot relative to the hub about an axis perpendicular to the first and second axes only when in a neutral position in order to engage in a locating recess defined by the support bracket.

2. An operating mechanism as claimed in claim 1, wherein the sliding axis of the sliding ball and socket joint extends at 45° to the first and the second axes when an arm of the transmission lever is in a substantially vertical position, the transmission lever being movably coupled to a portion of the sliding ball and socket joint.

3. An operating mechanism as claimed in claim 1, wherein the sliding ball and socket joint comprises a ball and a pin slidably received within a bore defined by the ball, the pin being configured to slide within the bore relative to the ball about the sliding axis of the ball and socket joint, the ball being retained in a spherical socket coupled to one of the actuating arm or the transmission lever, the pin being coupled to the other of the actuating arm or the transmission lever.

4. An operating mechanism as claimed in claim 1, wherein the actuating arm is formed as an integral part of the hub.

5. An operating mechanism as claimed in claim 1, wherein the operating lever is biased by a spring to engage in the locating recess.

6. An operating mechanism as claimed in claim 5, wherein the transmission lever is a bellcrank lever.

7. An operating mechanism as claimed in claim 1, wherein the operating lever is configured to be pivoted relative to the hub about a pin extending through the operating lever.

8. An operating mechanism for a Bowden cable, comprising:
- a support bracket,
- an operating lever,
- a hub mounted on the support bracket for rotation about a first axis by the operating lever,
- a transmission lever configured to be connected to the Bowden cable and mounted on the support bracket for pivoting about a second axis orthogonal to the first axis, and
- an actuating arm connected at one end to the hub and connected at its end remote from the hub by a sliding ball and socket joint to the transmission lever so that rotation of the hub about the first axis causes rotation of the transmission lever about the second axis to extend and retract the Bowden cable, such that a sliding axis of the ball and socket joint is inclined relative to both the first axis and the second axis,
- wherein the sliding ball and socket joint comprises a ball and a pin slidably received within a bore defined by the ball, the pin being configured to slide within the bore relative to the ball about the sliding axis of the ball and socket joint.

9. An operating mechanism as claimed in claim 8, wherein the operating lever is configured to pivot relative to the hub about an axis perpendicular to the first and second axes only when in a neutral position in order to engage in a locating recess.

10. An operating mechanism as claimed in claim 9, wherein the operating lever is biased by a spring to engage in the locating recess.

11. An operating mechanism as claimed in claim 8, wherein the transmission lever is a bellcrank lever.

12. An operating mechanism as claimed in claim 8, wherein the actuating arm is formed as an integral part of the hub.

13. An operating mechanism as claimed in claim 8, wherein the sliding axis of the sliding ball and socket joint extends at 45° to the first and the second axes when an arm of the transmission lever is in a substantially vertical position, the transmission lever being movably coupled to a portion of the sliding ball and socket joint.

14. An operating mechanism as claimed in claim 8, wherein the ball is retained within a spherical socket coupled to one of the actuating arm or the transmission lever and the pin is coupled to the other of the actuating arm or the transmission lever.

15. An operating mechanism as claimed in claim 8, wherein the pin is configured to slide relative to the ball about the sliding axis of the ball and socket joint when the hub is rotated about the first axis and the transmission lever is rotated about the second axis.

* * * * *